(12) United States Patent
Topka et al.

(10) Patent No.: US 6,892,145 B2
(45) Date of Patent: May 10, 2005

(54) METHOD AND SYSTEM FOR CONDITIONALLY TRIGGERED SYSTEM DATA CAPTURE

(75) Inventors: Terry Michael Topka, Scotia, NY (US); Daniel Lawrence Morrill, Clifton Park, NY (US); Marc Robert Pearlman, Clifton Park, NY (US); Stephen Eric Zingelewicz, Niskayuna, NY (US); Ertugrul Berkcan, Clifton Park, NY (US); William James Premerlani, Scotia, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/373,678

(22) Filed: Feb. 25, 2003

(65) Prior Publication Data

US 2003/0225482 A1 Dec. 4, 2003

Related U.S. Application Data (60) Provisional application No. 60/438,159, filed on Jan. 6, 2003, and provisional application No. 60/359,544, filed on Feb. 25, 2002.

(51) Int. Cl.[7] .............................................. G01R 31/36
(52) U.S. Cl. ............................ 702/62; 702/57; 702/60; 702/61; 700/286
(58) Field of Search ............................... 702/57, 60, 61, 702/62; 307/11, 19, 43, 51, 86, 112, 113, 132; 361/62; 700/286

(56) References Cited

U.S. PATENT DOCUMENTS

| | | |
|---|---|---|
| 3,772,505 A | 11/1973 | Massell |
| 3,938,007 A | 2/1976 | Boniger et al. |
| 3,956,671 A | 5/1976 | Nimmersjo |
| 3,963,964 A | 6/1976 | Mustaphi |
| 4,001,742 A | 1/1977 | Jencks et al. |
| 4,245,318 A | 1/1981 | Eckart et al. |
| 4,291,299 A | 9/1981 | Hinz et al. |
| 4,301,433 A | 11/1981 | Castonguay et al. |
| 4,311,919 A | 1/1982 | Nail |
| 4,415,968 A | 11/1983 | Maeda et al. |
| 4,423,459 A | 12/1983 | Stich et al. |
| 4,432,031 A | 2/1984 | Premerlani |

(Continued)

FOREIGN PATENT DOCUMENTS

| | | | |
|---|---|---|---|
| EP | 0718948 A2 | 6/1996 | .......... H02H/3/093 |
| EP | 0723325 A1 | 7/1996 | ............ H02H/7/26 |
| EP | 0949734 A2 | 10/1999 | .......... H02H/3/093 |

OTHER PUBLICATIONS

Atanackovic D. et al. An Integrated Knowledge–Based Model For Power–System Planning IEEE Expert, IEEE Inc. New York, Jul. 1997; pp. 65–71.

*Primary Examiner*—Carol S. W. Tsai
(74) *Attorney, Agent, or Firm*—Ohlandt, Greeley, Ruggiero & Perle (57) ABSTRACT

A method and apparatus for collecting power distribution system data is provided. The method includes communicatively coupling a plurality of node electronic units to a digital network, communicatively coupling at least one central control processing unit (CCPU) to the digital network, executing a data capture software module running on the at least one CCPU wherein the module includes a data capture buffer and a secondary buffer, and activating the data capture module in response to a triggering event. The apparatus includes a plurality of node electronic units, at least one central control processing unit (CCPU), and a data capture software module running on the at least one CCPU wherein the module includes a data capture buffer and a secondary buffer wherein the module is configured to collect data in the data capture buffer and the secondary buffer, and the module is configured to activate in response to a triggering event.

41 Claims, 7 Drawing Sheets

U.S. PATENT DOCUMENTS

| | | |
|---|---|---|
| 4,455,612 A | 6/1984 | Girgis et al. |
| 4,467,220 A * | 8/1984 | Page .......................... 307/19 |
| 4,468,714 A | 8/1984 | Russell |
| 4,589,074 A | 5/1986 | Thomas et al. |
| 4,623,949 A | 11/1986 | Salowe et al. |
| 4,631,625 A | 12/1986 | Alexander et al. |
| 4,642,724 A | 2/1987 | Ruta |
| 4,652,966 A | 3/1987 | Farag et al. |
| 4,672,501 A | 6/1987 | Bilac et al. |
| 4,672,555 A | 6/1987 | Hart et al. |
| 4,674,062 A | 6/1987 | Premerlani |
| 4,689,712 A | 8/1987 | Demeyer |
| 4,709,339 A | 11/1987 | Fernandes |
| 4,751,653 A | 6/1988 | Junk et al. |
| 4,752,853 A | 6/1988 | Matsko et al. |
| 4,754,407 A | 6/1988 | Nolan |
| 4,777,607 A | 10/1988 | Maury et al. |
| 4,783,748 A | 11/1988 | Swarztrauber et al. |
| 4,796,027 A | 1/1989 | Smith-Vaniz |
| 4,833,592 A | 5/1989 | Yamanaka |
| 4,849,848 A | 7/1989 | Ishii |
| 4,855,671 A | 8/1989 | Fernandes |
| 4,862,308 A | 8/1989 | Udren |
| 4,964,058 A | 10/1990 | Brown, Jr. |
| 4,977,529 A * | 12/1990 | Gregg et al. .................. 703/18 |
| 4,979,122 A | 12/1990 | Davis et al. |
| 4,983,955 A | 1/1991 | Ham, Jr. et al. |
| 4,996,646 A | 2/1991 | Farrington |
| 5,053,735 A | 10/1991 | Ohishi et al. |
| 5,060,166 A | 10/1991 | Engel et al. |
| 5,101,191 A | 3/1992 | MacFadyen et al. |
| 5,134,691 A | 7/1992 | Elms |
| 5,136,458 A | 8/1992 | Durivage, III |
| 5,162,664 A | 11/1992 | Haun et al. |
| 5,166,887 A | 11/1992 | Farrington et al. |
| 5,170,310 A | 12/1992 | Studtmann et al. |
| 5,170,360 A | 12/1992 | Porter et al. |
| 5,179,376 A | 1/1993 | Pomatto |
| 5,182,547 A | 1/1993 | Griffith |
| 5,185,705 A | 2/1993 | Farrington |
| 5,196,831 A | 3/1993 | Bscheider |
| 5,214,560 A | 5/1993 | Jensen |
| 5,216,621 A | 6/1993 | Dickens |
| 5,225,994 A | 7/1993 | Arinobu et al. |
| 5,231,565 A | 7/1993 | Bilas et al. |
| 5,237,511 A | 8/1993 | Caird et al. |
| 5,247,454 A | 9/1993 | Farrington et al. |
| 5,253,159 A | 10/1993 | Bilas et al. |
| 5,272,438 A | 12/1993 | Stumme |
| 5,301,121 A | 4/1994 | Garverick et al. |
| 5,305,174 A | 4/1994 | Morita et al. |
| 5,311,392 A | 5/1994 | Kinney et al. |
| 5,323,307 A | 6/1994 | Wolf et al. |
| 5,353,188 A | 10/1994 | Hatakeyama |
| 5,361,184 A | 11/1994 | El-Sharkawi et al. |
| 5,367,427 A | 11/1994 | Matsko et al. |
| 5,369,356 A | 11/1994 | Kinney et al. |
| 5,381,554 A | 1/1995 | Langer et al. |
| 5,384,712 A | 1/1995 | Oravetz et al. |
| 5,402,299 A | 3/1995 | Bellei |
| 5,406,495 A | 4/1995 | Hill |
| 5,414,635 A | 5/1995 | Ohta |
| 5,420,799 A | 5/1995 | Peterson et al. |
| 5,422,778 A | 6/1995 | Good et al. |
| 5,440,441 A | 8/1995 | Ahuja |
| 5,451,879 A | 9/1995 | Moore |
| 5,487,016 A | 1/1996 | Elms |
| 5,490,086 A | 2/1996 | Leone et al. |
| 5,493,468 A | 2/1996 | Hunter et al. |
| 5,530,738 A | 6/1996 | McEachern |
| 5,534,782 A | 7/1996 | Nourse |
| 5,534,833 A | 7/1996 | Castonguay et al. |
| 5,537,327 A | 7/1996 | Snow et al. |
| 5,544,065 A | 8/1996 | Engel et al. |
| 5,559,719 A | 9/1996 | Johnson et al. |
| 5,560,022 A | 9/1996 | Dunstan et al. |
| 5,576,625 A | 11/1996 | Sukegawa et al. |
| 5,581,471 A | 12/1996 | McEachern et al. |
| 5,587,917 A | 12/1996 | Elms |
| 5,596,473 A | 1/1997 | Johnson et al. |
| 5,600,527 A | 2/1997 | Engel et al. |
| 5,608,646 A | 3/1997 | Pomatto |
| 5,613,798 A | 3/1997 | Braverman |
| 5,619,392 A | 4/1997 | Bertsch et al. |
| 5,627,716 A | 5/1997 | Lagree et al. |
| 5,627,717 A | 5/1997 | Pein et al. |
| 5,627,718 A | 5/1997 | Engel et al. |
| 5,629,825 A | 5/1997 | Wallis et al. |
| 5,629,870 A * | 5/1997 | Farag et al. ................. 700/286 |
| 5,631,798 A | 5/1997 | Seymour et al. |
| 5,638,296 A | 6/1997 | Johnson et al. |
| 5,650,936 A | 7/1997 | Loucks et al. |
| 5,661,658 A | 8/1997 | Putt et al. |
| 5,666,256 A | 9/1997 | Zavis et al. |
| 5,670,923 A | 9/1997 | Gonzalez et al. |
| 5,694,329 A | 12/1997 | Pomatto |
| 5,696,695 A | 12/1997 | Ehlers et al. |
| 5,719,738 A | 2/1998 | Singer et al. |
| 5,734,576 A | 3/1998 | Klancher |
| 5,736,847 A | 4/1998 | Van Doorn et al. |
| 5,737,231 A | 4/1998 | Pyle et al. |
| 5,742,513 A | 4/1998 | Bouhenguel et al. |
| 5,751,524 A | 5/1998 | Swindler |
| 5,754,033 A | 5/1998 | Thomson |
| 5,754,440 A | 5/1998 | Cox et al. |
| 5,768,148 A * | 6/1998 | Murphy et al. ............. 700/286 |
| 5,784,237 A | 7/1998 | Velez |
| 5,784,243 A | 7/1998 | Pollman et al. |
| 5,786,699 A | 7/1998 | Sukegawa et al. |
| 5,812,389 A | 9/1998 | Katayama et al. |
| 5,821,704 A | 10/1998 | Carson et al. |
| 5,825,643 A | 10/1998 | Dvorak et al. |
| 5,828,576 A | 10/1998 | Loucks et al. |
| 5,828,983 A | 10/1998 | Lombardi |
| 5,831,428 A | 11/1998 | Pyle et al. |
| 5,867,385 A | 2/1999 | Brown et al. |
| 5,872,722 A | 2/1999 | Oravetz et al. |
| 5,872,785 A | 2/1999 | Kienberger |
| 5,890,097 A | 3/1999 | Cox |
| 5,892,449 A | 4/1999 | Reid et al. |
| 5,903,426 A | 5/1999 | Ehling |
| 5,905,616 A | 5/1999 | Lyke |
| 5,906,271 A | 5/1999 | Castonguay et al. |
| 5,926,089 A | 7/1999 | Sekiguchi et al. |
| 5,936,817 A | 8/1999 | Matsko et al. |
| 5,946,210 A | 8/1999 | Montminy et al. |
| 5,958,060 A | 9/1999 | Premerlani |
| 5,963,457 A | 10/1999 | Kanoi et al. |
| 5,973,481 A | 10/1999 | Thompson et al. |
| 5,973,899 A | 10/1999 | Williams et al. |
| 5,982,595 A | 11/1999 | Pozzuoli |
| 5,982,596 A | 11/1999 | Spencer et al. |
| 5,995,911 A | 11/1999 | Hart |
| 6,005,757 A | 12/1999 | Shvach et al. |
| 6,005,758 A | 12/1999 | Spencer et al. |
| 6,018,451 A | 1/2000 | Lyke et al. |
| 6,038,516 A | 3/2000 | Alexander et al. |
| 6,047,321 A | 4/2000 | Raab et al. |
| 6,054,661 A | 4/2000 | Castonguay et al. |
| 6,055,145 A | 4/2000 | Lagree et al. |
| 6,061,609 A | 5/2000 | Kanoi et al. |

| | | |
|---|---|---|
| 6,084,758 A | 7/2000 | Clarey et al. |
| 6,138,241 A | 10/2000 | Eckel et al. |
| 6,139,327 A | 10/2000 | Callahan et al. |
| 6,141,196 A | 10/2000 | Premerlani et al. |
| 6,157,527 A | 12/2000 | Spencer et al. |
| 6,167,329 A | 12/2000 | Engel et al. |
| 6,175,780 B1 | 1/2001 | Engel |
| 6,185,482 B1 | 2/2001 | Egolf et al. |
| 6,185,508 B1 | 2/2001 | Van Doorn et al. |
| 6,186,842 B1 | 2/2001 | Hirschbold et al. |
| 6,195,243 B1 | 2/2001 | Spencer et al. |
| 6,198,402 B1 | 3/2001 | Hasegawa et al. |
| 6,212,049 B1 | 4/2001 | Spencer et al. |
| 6,233,128 B1 | 5/2001 | Spencer et al. |
| 6,236,949 B1 | 5/2001 | Hart |
| 6,242,703 B1 | 6/2001 | Castonguay et al. |
| 6,268,991 B1 | 7/2001 | Criniti et al. |
| 6,285,917 B1 | 9/2001 | Sekiguchi et al. |
| 6,288,882 B1 | 9/2001 | DiSalvo et al. |
| 6,289,267 B1 | 9/2001 | Alexander et al. |
| 6,291,911 B1 | 9/2001 | Dunk et al. |
| 6,292,171 B1 | 9/2001 | Fu et al. |
| 6,292,340 B1 | 9/2001 | O'Regan et al. |
| 6,292,901 B1 | 9/2001 | Lys et al. |
| 6,297,939 B1 | 10/2001 | Bilac et al. |
| 6,313,975 B1 | 11/2001 | Dunne et al. |
| 6,341,054 B1 | 1/2002 | Walder et al. |
| 6,347,027 B1 | 2/2002 | Nelson et al. |
| 6,351,823 B1 | 2/2002 | Mayer et al. |
| 6,356,422 B1 | 3/2002 | Bilac et al. |
| 6,356,849 B1 | 3/2002 | Jaffe |
| 6,369,996 B1 | 4/2002 | Bo |
| 6,377,051 B1 | 4/2002 | Tyner et al. |
| 6,385,022 B1 | 5/2002 | Kulidjian et al. |
| 6,396,279 B1 | 5/2002 | Gruenert |
| 6,397,155 B1 | 5/2002 | Przydatek et al. |
| 6,405,104 B1 | 6/2002 | Dougherty |
| 6,406,328 B1 | 6/2002 | Attarian et al. |
| 6,411,865 B1 | 6/2002 | Qin et al. |
| 6,441,931 B1 | 8/2002 | Moskovich et al. |
| 6,459,997 B1 | 10/2002 | Andersen |
| 6,496,342 B1 | 12/2002 | Horvath et al. |
| 6,535,797 B1 | 3/2003 | Bowles et al. |
| 6,549,880 B1 | 4/2003 | Willoughby et al. |
| 6,553,418 B1 | 4/2003 | Collins et al. |
| 2001/0010032 A1 | 7/2001 | Ehlers et al. |
| 2001/0032025 A1 | 10/2001 | Lenz et al. |
| 2001/0044588 A1 | 11/2001 | Mault |
| 2001/0048354 A1 | 12/2001 | Douville et al. |
| 2001/0055965 A1 | 12/2001 | Delp et al. |
| 2002/0010518 A1 | 1/2002 | Reid et al. |
| 2002/0032535 A1 | 3/2002 | Alexander et al. |
| 2002/0034086 A1 | 3/2002 | Scoggins et al. |
| 2002/0045992 A1 | 4/2002 | Shincovich et al. |
| 2002/0059401 A1 | 5/2002 | Austin |
| 2002/0063635 A1 | 5/2002 | Shincoiv |
| 2002/0064010 A1 | 5/2002 | Nelson et al. |
| 2002/0091949 A1 | 7/2002 | Ykema |
| 2002/0094799 A1 | 7/2002 | Elliott et al. |
| 2002/0107615 A1 | 8/2002 | Bjorklund |
| 2002/0108065 A1 | 8/2002 | Mares |
| 2002/0109722 A1 | 8/2002 | Rogers et al. |
| 2002/0111980 A1 | 8/2002 | Miller et al. |
| 2002/0116092 A1 | 8/2002 | Hamamatsu et al. |
| 2002/0124011 A1 | 9/2002 | Baxter et al. |
| 2002/0146076 A1 | 10/2002 | Lee |
| 2002/0146083 A1 | 10/2002 | Lee et al. |
| 2002/0147503 A1 | 10/2002 | Osburn, III |
| 2002/0159402 A1 | 10/2002 | Binder |
| 2002/0162014 A1 | 10/2002 | Przydatek et al. |
| 2002/0163918 A1 | 11/2002 | Cline |
| 2002/0165677 A1 | 11/2002 | Lightbody et al. |
| 2002/0181174 A1 | 12/2002 | Bllac et al. |
| 2002/0193888 A1 | 12/2002 | Wewalaarachchi et al. |
| 2003/0043785 A1 | 3/2003 | Liu et al. |

\* cited by examiner

METHOD AND SYSTEM FOR CONDITIONALLY TRIGGERED SYSTEM DATA CAPTURE

CROSS REFERENCE TO RELATED APPLICATIONS

This application is related to U.S. patent application Ser. No. 60/359,544 filed on Feb. 25, 2002 for "Integrated Protection, Monitoring, and Control" the content of which is incorporated in its entirety herein by reference. This application is also related to U.S. patent application No. 60/438,159 filed on Jan. 6, 2003 for "Single Processor Concept for Protection and Control of Circuit Breakers in Low-Voltage Switchgear" the content of which is incorporated in its entirety herein by reference.

BACKGROUND OF THE INVENTION

This invention relates generally to electrical switchgear and more particularly, to a method and apparatus for protecting, monitoring, and controlling the electrical switchgear.

In an industrial power distribution system, power generated by a power generation company may be supplied to an industrial or commercial facility wherein the power is distributed around the industrial or commercial facility to various equipment such as, for example, motors, welding machinery, computers, heaters, lighting, and other electrical equipment. At least some known power distribution systems include switchgear which facilitates dividing the power into branch circuits which supply power to various portions of the industrial facility. Circuit breakers are provided in each branch circuit to facilitate protecting equipment within the branch circuit. Additionally, circuit breakers in each branch circuit can facilitate minimizing equipment failures since specific loads may be energized or de-energized without affecting other loads, thus creating increased efficiencies, and reduced operating and manufacturing costs. Similar switchgear may also be used within an electric utility transmission system and a plurality of distribution substations, although the switching operations used may be more complex.

Switchgear typically includes multiple devices other than the power distribution system components to provide protection, monitoring, and control of the power distribution system components. For example, at least some known power distribution systems include a monitor device to monitor a performance of the power distribution system, a control device to control an operation of the power distribution system, and a protection device to initiate a protective response when the protection device is activated.

Further, at least some known power distribution systems include a monitor and control system which operates independently of a protective system. At least some known power distribution system includes a protective system capable of initiating a shutdown command for a portion of the power distribution system, which is not recorded by the monitoring system. For example, a protective device may shut down a portion of the power distribution system based on its own limits and the monitoring devices do not record the event. The failure of the monitoring system to record the system shutdown may cause an operator to believe that an over-current condition has not occurred within the power distribution system, and a proper corrective action therefore is not initiated by the operator. Additionally, a protective device, i.e. a circuit breaker, may open because of an over-current condition in the power distribution system, and the control system may interpret the over-current condition as a loss of power from the source power rather than a fault condition. Further, the control logic may attempt to connect the faulted circuit to an alternate source, thereby restoring the over-current condition, or the control logic may receive information that the protective device has opened due to an over-current condition and attempt to provide power to a load from an inactive circuit.

Accordingly, at least one known system includes a data capture system configured to capture current and/or voltage waveforms. The data capture system includes dedicated hardware and wiring. The use of multiple devices and interconnecting wiring associated with the devices may cause an increase in equipment size, an increase in the complexity of wiring the devices, an increase in a quantity of devices installed, and an increase in operational defects which may occur using the devices. Additionally, there is no practical, low cost way of capturing the system data and state, surrounding, i.e., before and after, trigger events, e.g., faults and alarms, for all circuit breakers in the system.

BRIEF DESCRIPTION OF THE INVENTION

In one aspect method for collecting power distribution system data is provided. The method includes communicatively coupling a plurality of node electronic units to a digital network, communicatively coupling at least one central control processing unit (CCPU) to the digital network, executing a data capture software module running on the at least one CCPU wherein the module includes a data capture buffer and a secondary buffer, and activating the data capture module in response to a triggering event.

In another aspect, an apparatus for collecting power distribution system data is provided. The apparatus includes a plurality of node electronic units communicatively coupled to the network, at least one central control processing unit (CCPU) communicatively coupled to the network, and a data capture software module running on the at least one CCPU wherein the module includes a data capture buffer and a secondary buffer wherein the module is configured to collect data in the data capture buffer and the secondary buffer, and the module is configured to activate in response to a triggering event.

In yet another aspect, an apparatus for collecting power distribution system data is provided. The apparatus includes a plurality of node electronic units communicatively coupled to a digital network, at least one CCPU communicatively coupled to the digital network, and a data capture software module running on the at least one CCPU wherein the module is configured to collect data from the node electronics units and the CCPUs, and the module configured to activate in response to a triggering event. The module includes an internal data management (DM) module, and a data visualization, export, and processing (DVEP) module. The DM includes at least two circular buffers that include a data capture buffer and a secondary buffer, each buffer includes a predetermined collection interval wherein the DM is configured to determine a capture interval length, freeze the data capture buffer one capture interval time period after an event trigger is received, store a contents of the capture buffer to a file, and transfer the file to DVEP. DVEP is configured to determine a parameter that initiated said event trigger, and automatically display the parameter based on a predetermined format.

DETAILED DESCRIPTION OF THE INVENTION

The methods and apparatus described herein, referred to as system data capture describe an apparatus for a conditional logging, display or processing of data collected by a data capture system. In one embodiment, the method operates in a real-time data capture mode. In another embodiment, the method is also applicable to non-real-time systems. System data capture, when used with a circuit breaker control and protection system, allows system data to be analyzed off-line. Additionally, system data capture facilitates analysis of data collected from an entire system, e.g. current and voltage measurements, and breaker state, to facilitate identifying a plurality of fault types, and distinguishing between a legitimate fault and a nuisance trip.

Figure 1:
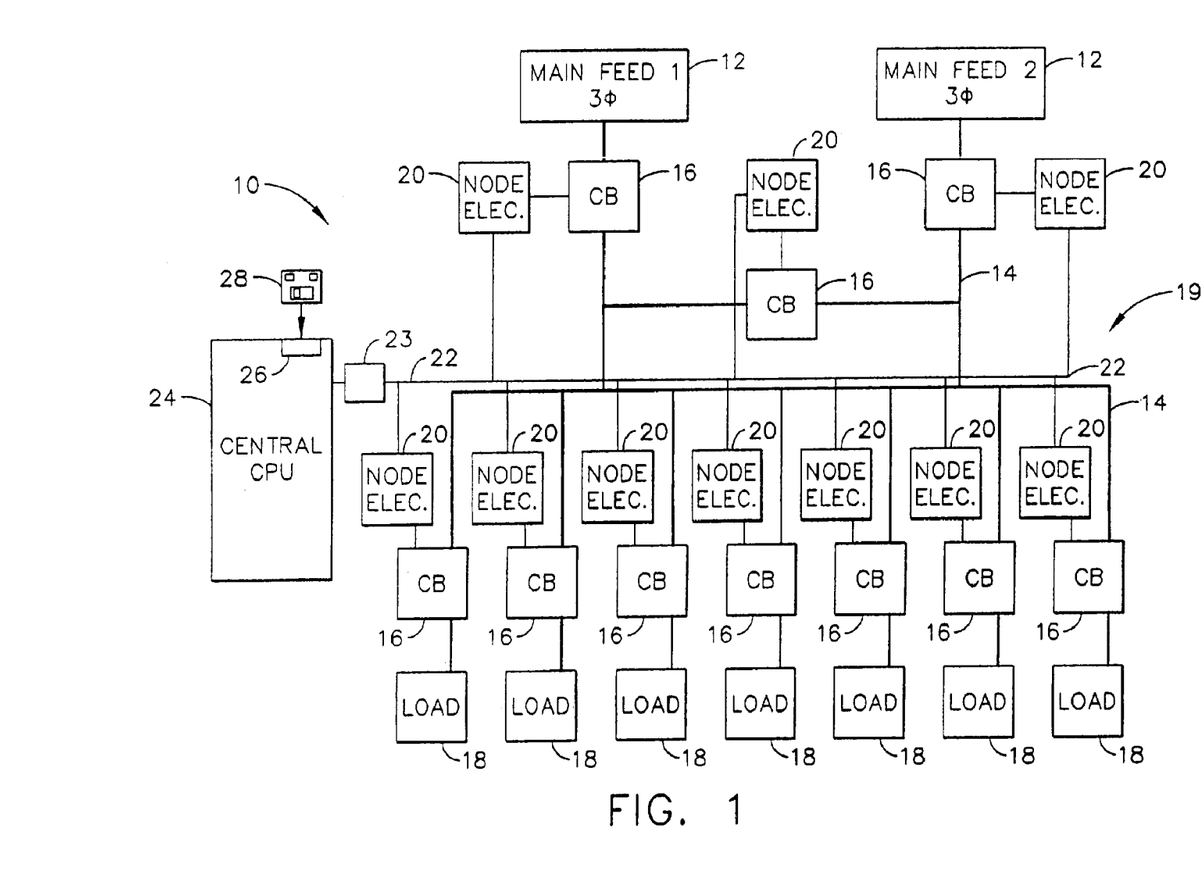
FIG. 1 illustrates an exemplary schematic illustration of a power distribution system that may be used by an industrial or commercial facility for example.

FIG. 1 illustrates an exemplary schematic illustration of a power distribution system 10, used by an industrial facility for example. In an exemplary embodiment, system 10 includes at least one main feed system 12, a power distribution bus 14, a plurality of power circuit switches or interrupters, also referred to herein as a circuit breakers (CB) 16, and at least one load 18, such as, but not limited to, motors, welding machinery, computers, heaters, lighting, and/or other electrical equipment.

In use, power is supplied to a main feed system 12, i.e. a switchboard for example, from a source (not shown) such as, but not limited to, a steam turbine, powered from, for example, a nuclear reactor or a coal fired boiler, a gas turbine generator, and a diesel generator. Power supplied to main feed system 12 is divided into a plurality of branch circuits using circuit breakers 16 which supply power to various loads 18 in the industrial facility. In addition, circuit breakers 16 are provided in each branch circuit to facilitate protecting equipment, i.e. loads 18, connected within the respective branch circuit. Additionally, circuit breakers 16 facilitate minimizing equipment failures since specific loads 18 may be energized or de-energized without affecting other loads 18, thus creating increased efficiencies, and reduced operating and manufacturing costs.

Power distribution system 10 includes a circuit breaker control protection system 19 that includes a plurality of node electronics units 20 that are each electrically coupled to a digital network 22. Circuit breaker control protection system 19 also includes at least one central control processing unit (CCPU) 24 that is electrically coupled to digital network 22 via a switch 23 such as, but not limited to, an Ethernet switch 23. In use, each respective node electronics unit 20 is electrically coupled to a respective circuit breaker 16, such that CCPU 24 is electrically coupled to each circuit breaker 16 through digital network 22 and through an associated node electronics unit 20.

In the exemplary embodiment, digital network 22 is a Fast Ethernet protocol network. In another embodiment, digital network 22 includes, for example, at least one of a local area network (LAN) or a wide area network (WAN), dial-in-connections, cable modems, and special high-speed ISDN lines. Digital network 22 also includes any device capable of interconnecting to the Internet including a web-based phone, personal digital assistant (PDA), or other web-based connectable equipment. It should be appreciated that the digital network 22 network is upgradeable based on future revisions to IEEE 802.3(u) and its successors. It should further be appreciated that the digital network 22 is configurable, for example, in a star topology.

In one embodiment, CCPU 24 is a computer and includes a device 26, for example, a floppy disk drive or CD-ROM drive, to facilitate reading instructions and/or data from a computer-readable medium 28, such as a floppy disk or CD-ROM. In another embodiment, CCPU 24 executes instructions stored in firmware (not shown). CCPU 24 is programmed to perform functions described herein, but other programmable circuits can likewise be programmed. Accordingly, as used herein, the term computer is not limited to just those integrated circuits referred to in the art as computers, but broadly refers to computers, processors, microcontrollers, microcomputers, programmable logic controllers, application specific integrated circuits, and other programmable circuits. Additionally, although described in a power distribution setting, it is contemplated that the benefits of the invention accrue to all electrical distribution systems including industrial systems such as, for example, but not limited to, an electrical distribution system installed in an office building.

Figure 2:
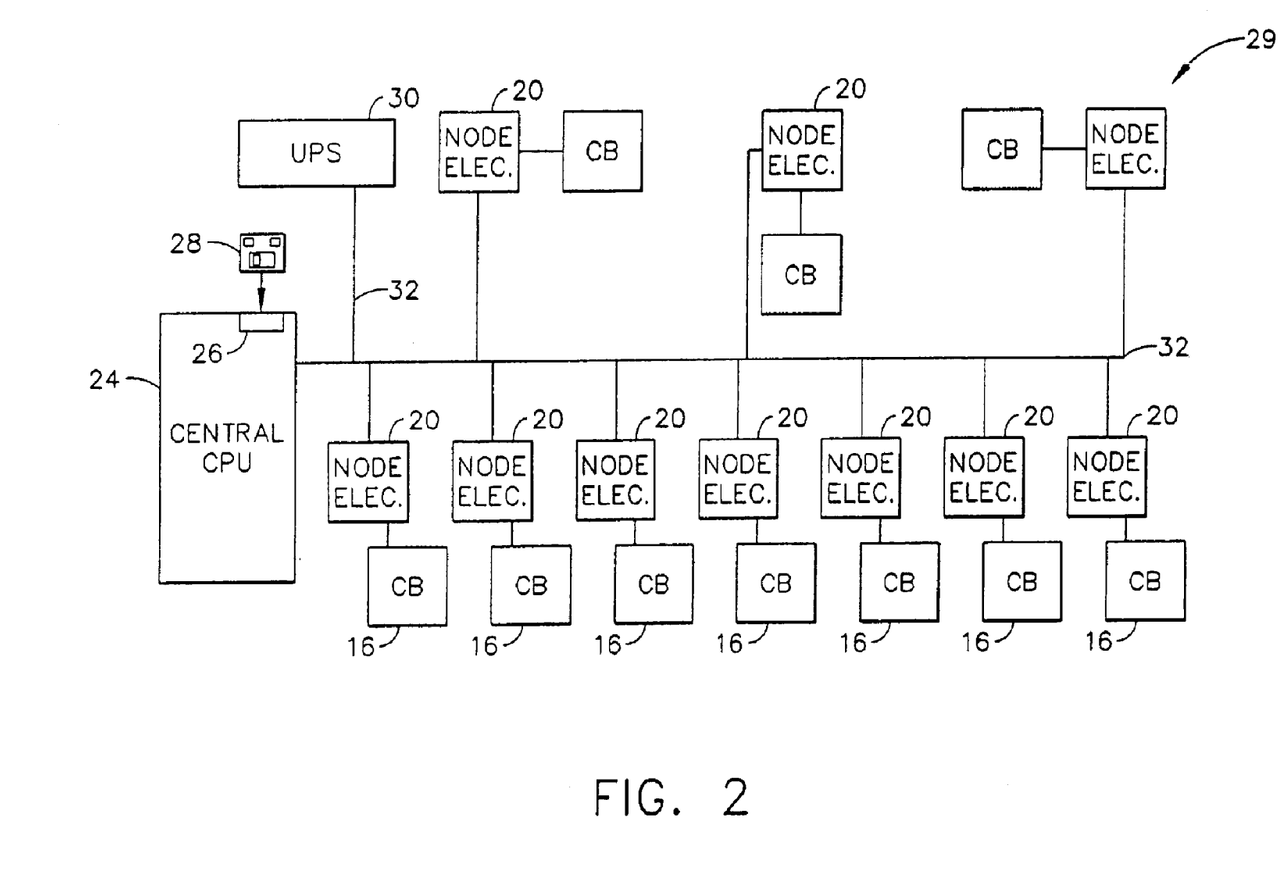
FIG. 2 is an exemplary schematic illustration of a node power distribution system that can be used with the power distribution system shown in FIG. 1.

FIG. 2 is an exemplary schematic illustration of a node power distribution system 29 that can be used with power distribution system 10 (shown in FIG. 1) and more specifically, with circuit breaker control protection system 19 (shown in FIG. 1). Node power distribution system 29 includes a power source 30 that is electrically coupled to node electronics units 20 through a node power distribution bus 32. In an exemplary embodiment, power source 30 is an uninterruptible power supply (UPS). In one embodiment, power source 30 receives power from power distribution system 10 and then distributes this power to node electronics units 20 through node power distribution bus 32. In an alternative embodiment, power is not supplied to power source 30, but rather, power source 30 supplies power to node electronics units 20 using an internal power supply, such as, but not limited to, a plurality of batteries (not shown). In another alternate embodiment, node electronic units 20 are powered by secondary current available from current sensor 82 and/or voltage sensor 84. In this embodiment, circuit breaker control protection system 19 would not include node power distribution system 29, power source 30, or node power distribution bus 32.

Figure 3:
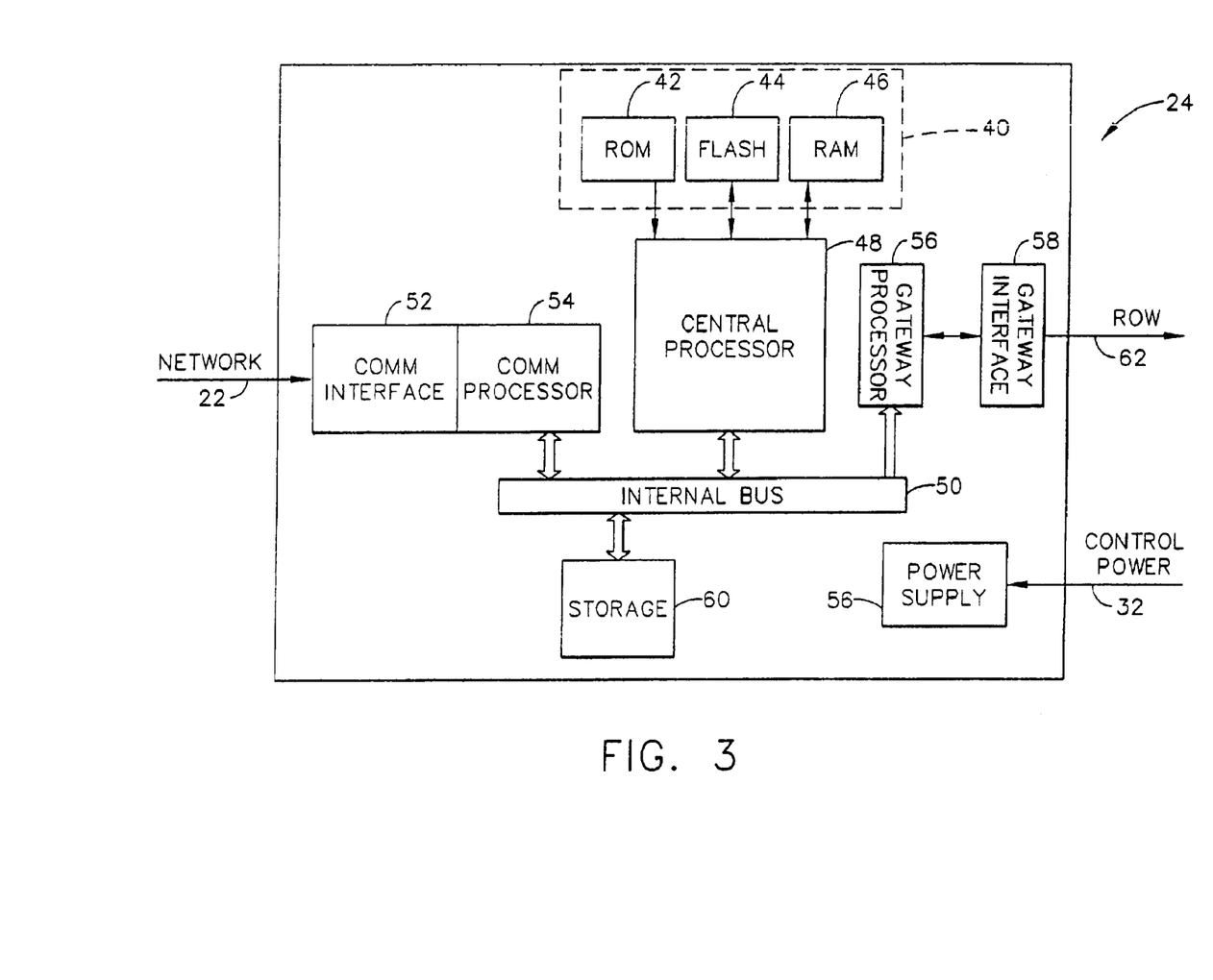
FIG. 3 is an exemplary schematic illustration of CCPU 24. CCPU 24 that may be used with the power distribution system shown in FIG. 1.

FIG. 3 is an exemplary schematic illustration of CCPU 24. CCPU 24 includes at least one memory device 40, such as, but not limited to, a read only memory (ROM) 42, a flash memory 44, and/or a random access memory (RAM) 46. CCPU 24 also includes a central processor unit (CPU) 48 that is electrically coupled to at least one memory device 40, as well as an internal bus 50, a communications interface 52, and a communications processor 54. In an exemplary embodiment, CCPU 24 is a printed circuit board and includes a power supply 56 to supply power to a plurality of devices on the printed circuit board. In another alternate embodiment, node electronic units 20 are powered by secondary current available from current sensor 82 and/or voltage sensor 84. In this embodiment, circuit breaker control protection system 19 would not include node power distribution system 29, power source 30, or node power distribution bus 32.

Additionally, in an exemplary embodiment, internal bus 50 includes an address bus, a data bus, and a control bus. In use, the address bus is configured to enable CPU 48 to address a plurality of internal memory locations or an input/output port, such as, but not limited to communications interface 52 through communications processor 54, and a gateway interface 58, through a gateway processor 56. The data bus is configured to transmit instructions and/or data between CPU 48 and at least one input/output, and the control bus is configured to transmit signals between the plurality of devices to facilitate ensuring that the devices are operating in synchronization. In the exemplary embodiment, internal bus 50 is a bi-directional bus such that signals can be transmitted in either direction on internal bus 50. CCPU 24 also includes at least one storage device 60 configured to store a plurality of information transmitted via internal bus 50.

In use, gateway interface 58 communicates to a remote workstation (not shown) via an Internet link 62 or an Intranet 62. In the exemplary embodiment, the remote workstation is a personal computer including a web browser. Although a single workstation is described, such functions as described herein can be performed at one of many personal computers coupled to gateway interface 58. For example, gateway interface 58 may be communicatively coupled to various individuals, including local operators and to third parties, e.g., remote system operators via an ISP Internet connection. The communication in the example embodiment is illustrated as being performed via the Internet, however, any other wide area network (WAN) type communication can be utilized in other embodiments, i.e., the systems and processes are not limited to being practiced via the Internet. In one embodiment, information is received at gateway interface 58 and transmitted to node electronics unit 20 via CCPU 24 and digital network 22. In another embodiment, information sent from node electronics unit 20 is received at communication interface 52 and transmitted to Internet 62 via gateway interface 58.

Figure 4:
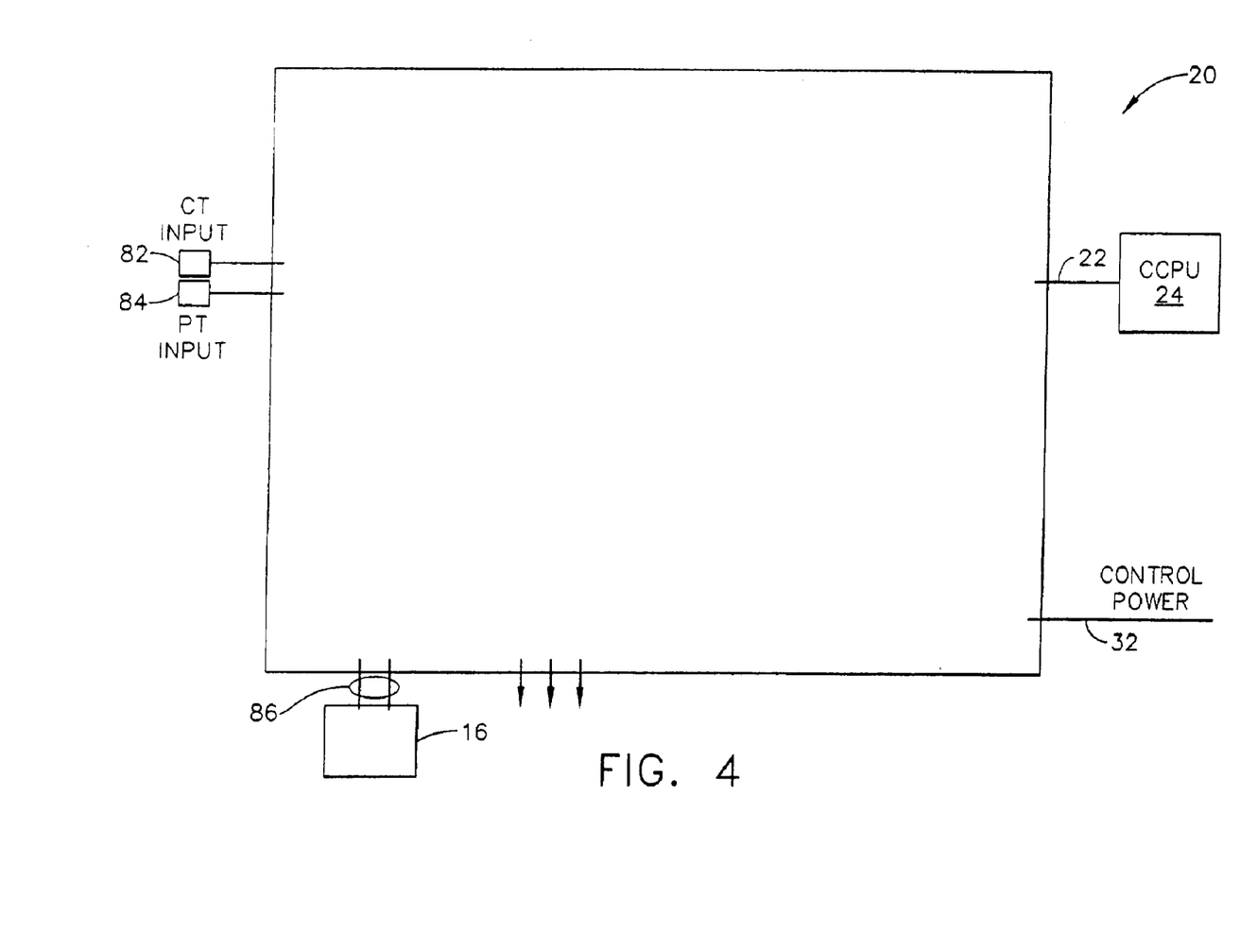
FIG. 4 is an exemplary schematic illustration of a single node electronic unit that may be used with the power distribution system shown in FIG. 1.

FIG. 4 is an exemplary schematic illustration of single node electronic unit 20. In the exemplary embodiment, node electronic unit 20 is a unitary device mounted remotely from CCPU 24 and circuit breaker 16. In an exemplary embodiment, node electronic unit 20 is separate from, but proximate to circuit breaker 16. In an exemplary embodiment, node electronic unit 20 is a printed circuit board.

In one embodiment, node electronics unit 20 receives signals input from a plurality of devices, such as, but not limited to, a current sensor 82, a voltage sensor 84, and/or circuit breaker 16. Status signals from circuit breaker 16 can include signals related to one or more conditions of the breaker, such as, but not limited to, an auxiliary switch status, and a spring charge switch status. Additionally, node electronics unit 20 sends signals to at least circuit breaker 16 in order to control one or more states of the breaker.

In use, signals are transmitted to CCPU 24 via node electronics unit 20, and digital network 22. Node electronics unit 20 receives the signals and packages a digital message that includes the signals and additional data relating to a health and status of node electronics unit 20. The health and status data may include information based on problems found by internal diagnostic routines and a status of self checking routines that run locally in node electronics unit 20. CCPU 24 processes digital message using one or more protection algorithms, monitoring algorithms, and any combination thereof. In response to the processing of digital message, CCPU 24 sends digital message back to node electronics unit 20 via digital network 22. In the exemplary embodiment, node electronics unit 20 actuates circuit breaker 16 via signal in response to digital message received from CCPU 24. In one embodiment, circuit breaker 16 is actuated in response to commands sent only by CCPU 24, i.e., circuit breaker 16 is not controlled locally by node electronics unit 20, but rather is operated remotely from CCPU 24 based on digital message received from node electronics unit 20 over network 22.

Figure 5:
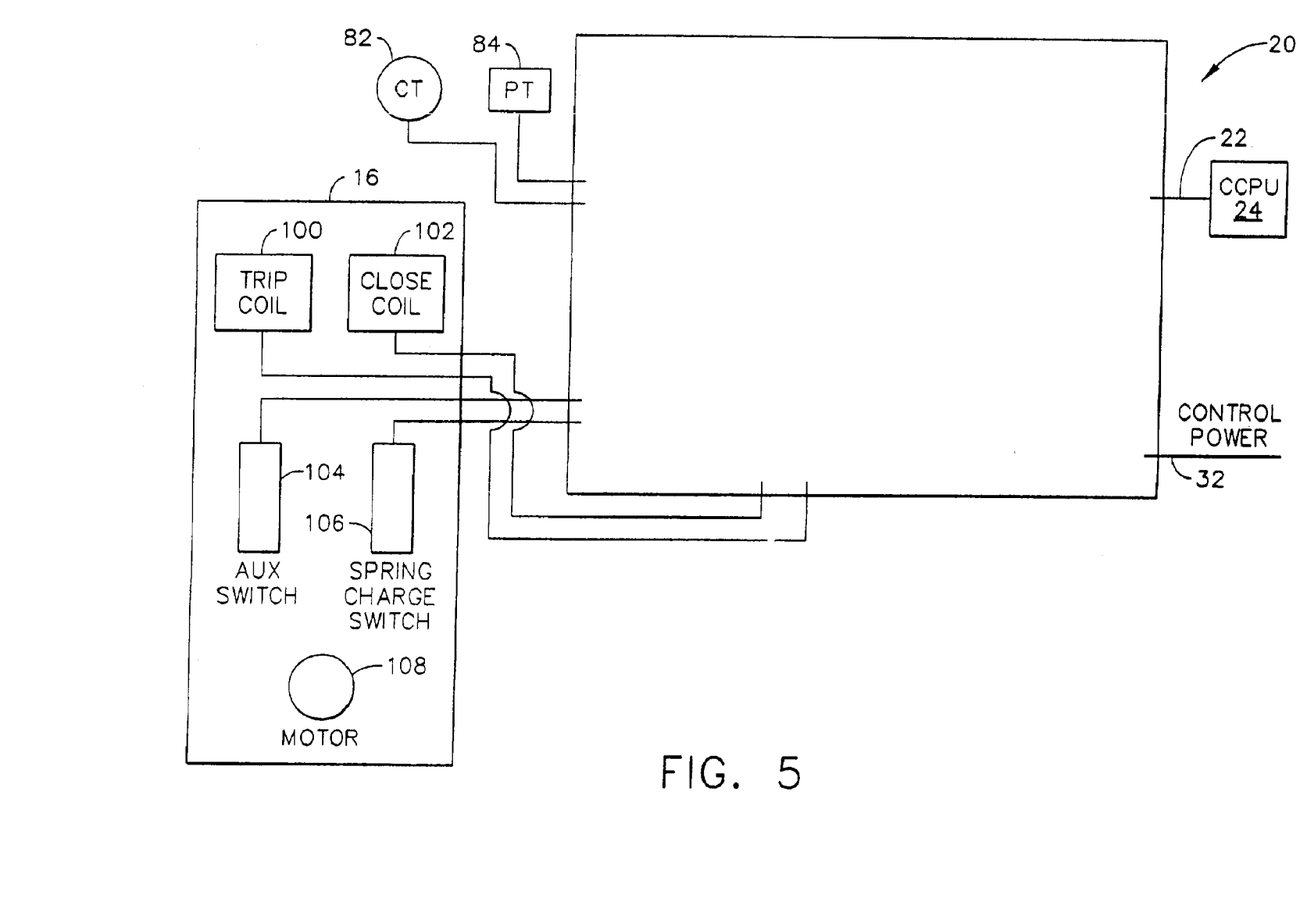
FIG. 5 is an exemplary schematic illustration of a circuit breaker that may be used with the power distribution system shown in FIG. 1.

FIG. 5 is an exemplary schematic illustration of circuit breaker 16 that is electrically coupled to node electronics unit 20. In the exemplary embodiment, circuit breaker 16 includes a switch assembly that includes movable and/or stationary contacts, an arc suppression means, and a tripping and operating mechanism. Circuit breaker 16 includes only a trip coil 100, a close coil 102, an auxiliary switch 104, a spring charge switch 106, and a motor 108. Circuit breaker 16 does not include a trip unit. The various components of breaker 16 (e.g., trip coil 100, close coil 102, auxiliary switch 104, spring charge switch 106, motor 108) can be powered by node electronics unit 20. Alternately, breaker 16 can be powered by secondary current available from current sensor 82 and/or voltage sensor 84.

Circuit breaker 16 is in electrical communication with node electronics unit 20 through a wiring harness, which may include copper wiring, communications conduits, and any combination thereof. Current sensor 82, and voltage sensor 84 are in electrical communication with node electronics unit 20 through a cable that may include copper wiring, communications conduits, and any combination thereof. In an exemplary embodiment, circuit breaker 16 is a unitary device mounted proximate to node electronics unit 20, current sensor 82, and voltage sensor 84.

In use, actuation signals from node electronics unit 20 are transmitted to circuit breaker 16 to actuate a plurality of functions in circuit breaker 16, such as, but not limited to, operating a trip coil 100, operating a close coil 102, and affecting a circuit breaker lockout feature. An auxiliary switch 104 and operating spring charge switch 106 provide a status indication of circuit breaker parameters to node electronics unit 20. Motor 108 is configured to recharge an operating spring, configured as a close spring (not shown) after circuit breaker 16 closes. It should be appreciated that the motor 108 can include, for example, a spring charge switch, a solenoid or any other electro-mechanical device capable of recharging a trip spring. To close circuit breaker 16, a close coil 102 is energized by a close signal from actuation power module (not shown). Close coil 102 actuates a closing mechanism (not shown) that couples at least one movable electrical contact (not shown) to a corresponding fixed electrical contact (not shown). The closing mechanism of circuit breaker 16 latches in a closed position such that when close coil 102 is de-energized, circuit breaker 16 remains closed. When breaker 16 closes, an "a" contact of auxiliary switch 104 also closes and a "b" contact of auxiliary switch 104 opens. The position of the "a" and "b" contacts is sensed by node electronics unit 20. To open circuit breaker 16, node electronics unit 20 energizes trip coil (TC) 100. TC 100 acts directly on circuit breaker 16 to release the latching mechanism that holds circuit breaker 16 closed. When the latching mechanism is released, circuit breaker 16 will open, opening the "a" contact and closing the "b" contact of auxiliary switch 104. Trip coil 100 is then de-energized by node electronics unit 20. After breaker 16 opens, with the close spring recharged by motor 108, circuit breaker 16 is prepared for a next operating cycle. In the exemplary embodiment, each node electronics unit 20 is coupled to circuit breaker 16 in a one-to-one correspondence. For example, each node electronics unit 20 communicates directly with only one circuit breaker 16. In an alternative embodiment, node electronics unit 20 may communicate with a plurality of circuit breakers 16.

Figure 6:
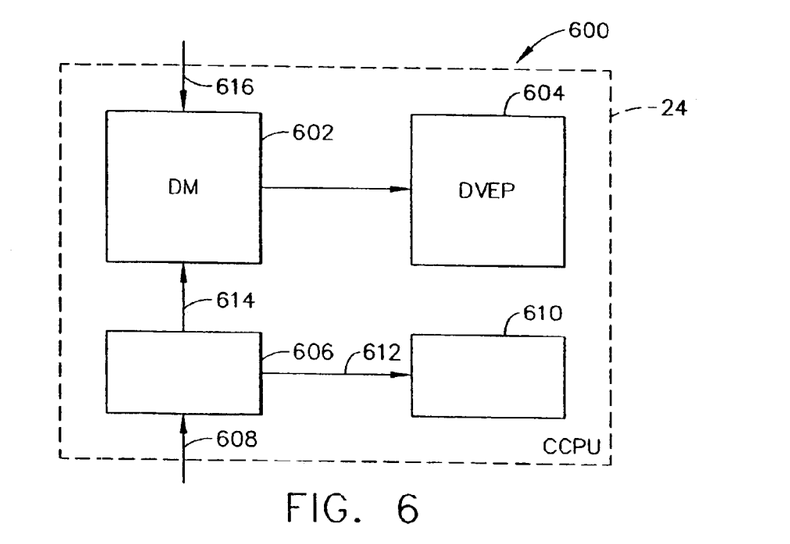
FIG. 6 is an illustration of an exemplary data capture system which can be used with the power distribution system shown in FIG. 1.

FIG. 6 is an illustration of an exemplary data capture system 600 which can be used with power distribution system 10 shown in FIG. 1. In an exemplary embodiment, data capture system 600 includes an internal data management (DM) module 602, and a data visualization, export and/or processing (DVEP) module 604 coupled to an interface 606. Interface 606 receives raw input data from all node electronics units operating on power distribution system 10 through a connection 608. The data is sent to a CCPU processing module 610 through connection 612 for further processing by CCPU 24. The data is also sent to data management module 602 through connection 614 for capture in buffers internal to data management module 602. An event trigger 616 initiates the data capture process within data management module 602. Event trigger 616 may be an internal trigger generated within CCPU 24 based on an output of predetermined conditioned logic that may be based on CCPU 24 calculations and/or a user's requirements. Event trigger 616 may be an external trigger generated by components communicating with CCPU 24 that sense a triggering event or calculate a result that indicates a data capture condition. In one embodiment, components communicating with CCPU 24 include, for example, an external distributed control system (DCS) (not shown), a network switch 23, a network hub (not shown), and a node electronics unit 20. After processing the event, data management module 602 transmits a file of the captured data through connection 618 to data visualization, export and/or processing (DVEP) module 604 where it is further processing and handled for future analysis and troubleshooting of power distribution system 10.

Figure 7:
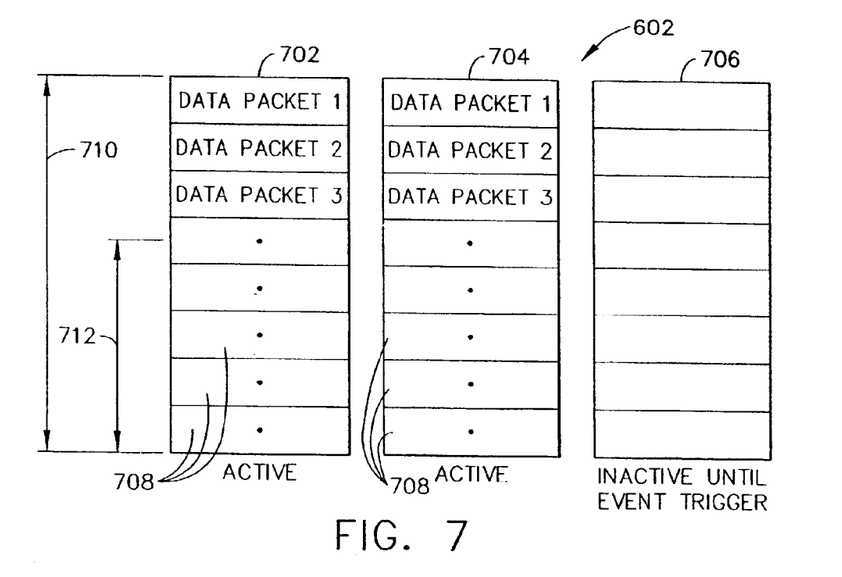
FIG. 7 is a schematic block diagram of a portion of data management module that is shown in FIG. 6.

FIG. 7 is a schematic block diagram of a portion 700 of data management module 602 that is shown in FIG. 6. Data management module 602 includes at least two buffers that are initialized and executed upon startup of data management module 602. The at least two buffers include a capture buffer 702 and a secondary buffer 704. Upon startup of data management module 602, buffers 702 and 704 are operable to collect and store a plurality of data received from interface 606. In one embodiment, a third buffer 706 is initialized at startup of data management module 602 but, is not active until data management module 602 receives an event trigger 616. In another embodiment, third buffer 706 is not initialized until data management module 602 receives an event trigger 616. Each buffer 702, 704, and 706 is initialized to include a plurality of storage locations for data packets received from interface 606. Each buffer is also initialized to be able to store a predetermined number of data packets based on a default or a number selectable by a user. Buffers 702, 704, and 706 are configured as circular buffers, such that, when the buffer becomes full, it writes over the oldest data with the newest received data in a circular fashion. The size of the buffers, or the collection interval 710, facilitates determining the amount of time the buffers can store data until they begin writing over old data, or the size of the buffers facilitates determining the length of the time window the buffers are able to hold. A capture interval 712 represents approximately one half of collection interval 710. When an event trigger is received by data management module 602, data management module 602 determines the length of capture interval 712 based on the length of collection interval 710. After receipt of an event trigger, capture buffer 702 will continue collecting data for a time period corresponding to capture interval 712 and then capture buffer 702 will freeze, or cease taking data and assume an inactive state. Additionally, secondary buffer 704 will be identified as the new capture buffer and third buffer 706 will be initialized, activated, and identified as the new secondary buffer. In this way, data management module 602 is prepared to receive and process a subsequent event trigger. After capture buffer 702 is frozen and made inactive, its contents are stored in a file and data visualization, export and/or processing (DVEP) module 604 is sent the file location for further processing.

Figure 8:
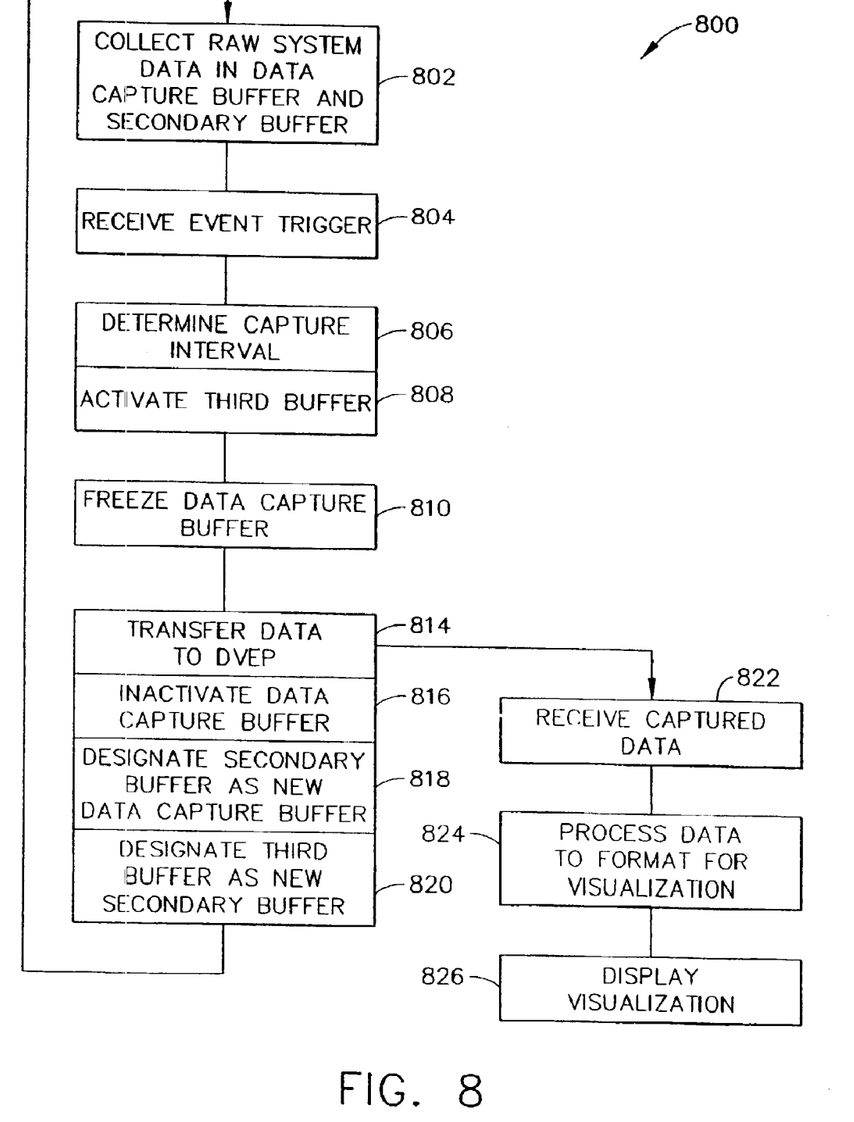
FIG. 8 is a flowchart illustrating an exemplary process that may be employed by the data capture system shown in FIG. 6.

FIG. 8 is a flowchart 800 illustrating an exemplary process that may be employed by data capture system 600. DM module 602 is configured to continuously collect 802 and buffer data received from a plurality of node electronic units 20, such that when a trigger event occurs 804, either an internal trigger or an external trigger, a capture time interval surrounding the trigger event is determined 806. Data management module 602 includes a plurality of circular data buffers for storing incoming data at a high speed. A first buffer 702 and a second buffer 704 collect 802 incoming data continuously. A third buffer 706 is inactive until a trigger event occurs 804. Buffers 702, 704, and 706 are arranged as circular buffers to allow data to be stored continuously, with the newer data overwriting the older data. Each buffer 702, 704, and 706 includes a plurality data storage locations 708 that store the incoming data for an interval 710 predetermined by a user. The length of interval 710 determines the amount of data stored in each buffer 702, 704, and 706, the amount of memory required to store the data, and the time interval captured by each buffer 702, 704, and 706.

In use, buffers 702 and 704 are active and collect 802 data coincidently, each buffer containing a copy of the same data as the other buffer. When a trigger event occurs 804, for example at a time zero ($t_0$), data management module 602 determines 806 a capture interval 712, that is approximately equal to one half of interval 710, and initializes and activates 808 third buffer 706. At time zero, all three buffers are active and collecting identical copies of incoming data. Buffers 702 and 704 contain data history approximately equal to interval 710. The buffers 702, 704, and 706 continue collecting data for a period approximately equal to interval 712, or a time one ($t_1$). At $t_1$, buffer 702 ceases collecting 810 data, transfers 814 the collected data to data visualization, export and/or processing (DVEP) module 604, and assumes 816 an inactive state. Buffers 704 and 706 continue collecting data until a second trigger event wherein buffer 704 assumes 818 the role of the data capture buffer third buffer 706 becomes 820 the secondary buffer and a fourth buffer (not shown) is activated. The process continues in this manner indefinitely.

A data capture methodology as described above allows capture of power distribution system 10 data from all node electronics units 20 and CCPU 24 that includes an interval 712 of data captured before the triggering event occurred and an interval 712 of data captured after the triggering event occurred.

Data visualization, export and/or processing (DVEP) module 604 receives 822 the captured data file from data management module 602 and further processes 824 the data to allow access to data that includes, for example, state information of each node electronics unit 20, each circuit breaker 16, power distribution system 10 electrical parameters, and CCPU 24 state information. The captured data file includes data in its raw form, meaning as received from each node electronics unit 20, CCPU 24, and other components in power distribution system 10. Data visualization, export and/or processing (DVEP) module 604, for example, opens the capture data file, extracts data relevant to the triggering event, formats the data in a predetermined format, and presents 826 the formatted data on a predetermined display for observation by a user. Data visualization, export and/or processing (DVEP) module 604 also prepares the captured data for further manipulation by the user and export to other computer systems or data handling modules.

Data capture system 600 facilitates capturing data for at least one of, display, export, and processing, based on at least one criteria, such as, but not limited to, current/voltage levels of power distribution system 10, a specified collection time, and, a plurality of event sequences. Continuous data collection, facilitates ensuring that pre-trigger data has been collected. Additionally, system 600 facilitates providing an integrated mechanism for the conditional visualization, export and/or processing of data collected by system 600. Within the context of circuit power distribution system 10, system 100 data capture capabilities, such as, but not limited to, system data analysis for nuisance trip verification, can be integrated into CCPU 24, without disrupting power distribution system 10 real time data capture and protection functions.

As described herein, system 600 is configured to capture data from power distribution system 10 when a trigger, internal or external, is activated in DM module 602 and facilitates continuous data collection display/export/visualization of specified pre-trigger data using DVEP module 604. Additionally, optional DVEP scheduling and prioritization is provided to support integrated system data capture without disrupting real-time system execution.

While the invention has been described in terms of various specific embodiments, those skilled in the art will recognize that the invention can be practiced with modification within the spirit and scope of the claims.

What is claimed is:

1. A method for collecting power distribution system data, said method comprising:
communicatively coupling a plurality of node electronic units to a digital network, said plurality of node electronic units receiving at least one input signal sensed by a device selected from the group consisting of a current sensor, a voltage sensor, circuit breaker, and any combinations thereof;
communicatively coupling at least one central control processing unit (CCPU) to the digital network;
executing a data capture module, wherein the module comprises a data capture buffer and a secondary buffer;
controlling said at least one central control processing unit to determine whether an event has occurred in the power distribution system based on said at least one input signal; and
activating the data capture module in response to said event.

2. A method in accordance with claim 1 further comprising capturing data from the plurality of node electronics units in at least two buffers wherein each buffer is a circular buffer.

3. A method in accordance with claim 2 wherein said capturing data in at least two buffers comprises capturing raw data from at least one of all node electronics units coupled to the network and the CCPU.

4. A method in accordance with claim 3 wherein said capturing raw data from at least one of all node electronics units coupled to the network and the CCPU comprises capturing at least parameter selected from the group consisting of: a power distribution system current, a power distribution system voltage, and a circuit breaker state.

5. A method in accordance with claim 2 wherein said capturing data in at least two buffers comprises capturing data in buffers that include a predetermined collection interval.

6. A method in accordance with claim 2 wherein said capturing data in at least two buffers comprises capturing data in at least one buffer at all times.

7. A method in accordance with claim 1 wherein said executing a data capture module comprises monitoring an event input.

8. A method in accordance with claim 7 wherein said monitoring an event input is at least one event selected from the group consisting of: an external event and an internal event.

9. A method in accordance with claim 8 wherein said external event is generated from at least one of: a node electronics unit, a network switch, a network hub, and an external system trigger.

10. A method in accordance with claim 8 wherein said internal event is generated from at least one of: CCPU hardware and CCPU software.

11. A method in accordance with claim 1 wherein said activating the data capture system comprises activating a data capture system including an internal data management (DM) module, and a data visualization, export, and processing (DVEP) module.

12. A method for collecting power distribution system data, said method comprising:
communicatively coupling a plurality of node electronic units to a digital network;
communicatively coupling at least one central control processing unit (CCPU) to the digital network;
executing a data capture module, wherein the module comprises a data capture buffer and a secondary buffer; and
activating the data capture module in response to an event, wherein said activating the data capture system comprises activating a data capture system including an internal data management (DM) module, and a data visualization, export, and processing (DVEP) module, and wherein said activating the data capture system including an internal data management (DM) module which comprises:
determining a capture interval length;
capturing identical data in at least one additional buffer after an event trigger is received;
freezing the data capture buffer one capture interval time period after an event trigger is received; and
transferring the captured data to the DVEP.

13. A method in accordance with claim 12 wherein said determining a capture interval comprises determining a capture interval length to be approximately one-half of the collection interval length.

14. A method in accordance with claim 12 wherein said freezing the data capture buffer comprises freezing the data capture buffer such that the data capture buffer includes one data capture interval time period of data captured prior to the event and one data capture time interval of data captured after the event.

15. A method in accordance with claim 12 wherein said freezing the data capture buffer one capture interval time period after the event is received comprises extending the capture interval length when a second event is received during the capture interval time period.

16. A method in accordance with claim 12 wherein said transferring the data to the DVEP further comprises:
   determining at least one parameter that describes the initiated event; and
   displaying the parameters based on a predetermined format.

17. A method in accordance with claim 16 wherein said displaying the parameter based on a predetermined format comprises automatically displaying the parameters based on a predetermined format.

18. A method in accordance with claim 1 wherein activating the data capture module further comprises preparing the data capture buffer and the secondary buffer for a subsequent event.

19. A method for collecting power distribution system data, said method comprising:
   communicatively coupling a plurality of node electronic units to a digital network;
   communicatively coupling at least one central control processing unit (CCPU) to the digital network;
   executing a data capture module, wherein the module comprises a data capture buffer and a secondary buffer; and
   activating the data capture module in response to an event, wherein activating the data capture module further comprises preparing the data capture buffer and the secondary buffer for a subsequent event, and wherein preparing the data capture buffer and the secondary buffer comprises:
   deactivating the data capture buffer;
   identifying the secondary buffer as a data capture buffer; and
   initiating a new secondary buffer.

20. An apparatus for collecting power distribution system data, said apparatus comprising:
   a plurality of node electronic units communicatively coupled to a digital network, said plurality of node electronic units receiving at least one input signal sensed by a device selected from the group consisting of a current sensor, a voltage sensor, circuit breaker, and any combinations thereof;
   at least one central control processing unit (CCPU) communicatively coupled to said digital network, said at least one central control processing unit configured to determine whether an event has occurred in the power distribution system based on said at least one input signal; and
   a data capture module, wherein said module includes a data capture buffer and a secondary buffer, said module configured to collect data in said data capture buffer and said secondary buffer, and said module configured to activate in response to an event.

21. An apparatus in accordance with claim 20 wherein said apparatus comprises at least two circular buffers.

22. An apparatus in accordance with claim 21 wherein said buffers include a predetermined collection interval.

23. An apparatus in accordance with claim 21 wherein said at least two buffers are configured to capture data in at least one buffer at all times.

24. An apparatus in accordance with claim 20 wherein said apparatus is configured to capture data from at least one of all node electronics units coupled to said network and said CCPU.

25. An apparatus in accordance with claim 24 wherein said apparatus is configured to capture at least one parameter selected from the group consisting of: a power distribution system current, a power distribution system voltage, and a circuit breaker state.

26. An apparatus in accordance with claim 20 wherein said data capture module is configured to monitor an event input.

27. An apparatus in accordance with claim 26 wherein said event is at least one selected from the group consisting of: an external event and an internal event.

28. An apparatus in accordance with claim 27 wherein said external event is generated from at least one selected from: a node electronics unit event trigger input, a network switch event trigger input, a network hub event trigger input, and an external system event trigger input.

29. An apparatus in accordance with claim 27 wherein said internal event is generated from at least one select from: a CCPU hardware event trigger input and a CCPU software event trigger input.

30. An apparatus in accordance with claim 20 wherein said apparatus comprises an internal data management (DM) module, and a data visualization, export, and processing (DVEP) module.

31. An apparatus for collecting power distribution system data, said apparatus comprising:
   a plurality of node electronic units communicatively coupled to a digital network;
   at least one central control processing unit (CCPU) communicatively coupled to said digital network; and
   a data capture module, wherein said module includes a data capture buffer and a secondary buffer, said module configured to collect data in said data capture buffer and said secondary buffer, and said module configured to activate in response to an event, wherein said apparatus comprises an internal data management (DM) module, and a data visualization, export, and processing (DVEP) module, and wherein said internal data management (DM) module is configured to:
   determine a capture interval length;
   capture identical data in at least one additional buffer after an event trigger is received;
   freeze said data capture buffer one capture interval time period after an event trigger is received; and
   transfer said captured data to said DVEP.

32. An apparatus in accordance with claim 31 wherein said capture interval length is approximately one-half of said collection interval length.

33. An apparatus in accordance with claim 31 wherein said frozen data capture buffer comprises one data capture interval time period of data captured prior to said event and one data capture time interval of data captured after said event.

34. An apparatus in accordance with claim 31 wherein said apparatus is further configured to:
   determine a parameter that that describes the initiated event trigger; and
   display said parameter based on a predetermined format.

35. An apparatus in accordance with claim 34 wherein said apparatus is further configured to automatically display said parameter based on a predetermined format.

36. An apparatus in accordance with claim 20 wherein said apparatus is further configured to prepare said data capture buffer and said secondary buffer for a subsequent event.

37. An apparatus for collecting power distribution system data, said apparatus comprising:
- a plurality of node electronic units communicatively coupled to a digital network;
- at least one central control processing unit (CCPU) communicatively coupled to said digital network; and
- a data capture module, wherein said module includes a data capture buffer and a secondary buffer, said module configured to collect data in said data capture buffer and said secondary buffer, and said module configured to activate in response to an event, wherein said apparatus is further configured to prepare said data capture buffer and said secondary buffer for a subsequent event, and wherein said apparatus is further configured to:
- deactivate said data capture buffer;
- identify said secondary buffer as a data capture buffer; and
- initiate a new secondary buffer.

38. An apparatus for collecting power distribution system data, said apparatus comprising:
- a plurality of node electronic units communicatively coupled to a digital network;
- at least one central control processing unit (CCPU) communicatively coupled to said digital network; and
- a data capture module, said module configured to collect data from said node electronics units and said CCPU, and said module configured to activate in response to an event, said module comprising:
- an internal data management (DM) module, and a data visualization, export, and processing (DVEP) module, said DM comprises at least two circular buffers that include a data capture buffer and a secondary buffer, each said buffers include a predetermined collection interval wherein said DM is configured to:
- determine a capture interval length;
- freeze said data capture buffer one capture interval time period after said event is received; and
- transfer said captured data to said DVEP wherein said DVEP is configured to determine at least one parameter that describes said initiated event trigger, and to automatically display said parameter based on a predetermined format.

39. An apparatus in accordance with claim 38 wherein said apparatus is further configured to deactivate said data capture buffer, identify said secondary buffer as a data capture buffer, and initiate a new secondary buffer.

40. A method in accordance with claim 1 further comprising controlling said at least one central control processing unit to change a state of one or more devices in the power distribution system based on said at least one input signal.

41. An apparatus in accordance with claim 20 wherein said at least one central control processing unit is configured to change a state of one or more devices in the power distribution system based on said at least one input signal.

* * * * *